(12) United States Patent
Aoki

(10) Patent No.: US 7,013,475 B2
(45) Date of Patent: *Mar. 14, 2006

(54) OPTICAL DISK DRIVE AND RECORDING AND REPRODUCING APPARATUS WITH MAGNETIC CLAMPING

(75) Inventor: Yoshitaka Aoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 11/074,655

(22) Filed: Mar. 9, 2005

(65) Prior Publication Data

US 2005/0183107 A1    Aug. 18, 2005

Related U.S. Application Data

(63) Continuation of application No. 09/704,856, filed on Nov. 2, 2000, now Pat. No. 6,877,165.

(30) Foreign Application Priority Data

Nov. 18, 1999 (JP) ................................ 11-328830

(51) Int. Cl.
*G11B 17/028* (2006.01)
(52) U.S. Cl. .................................... 720/710
(58) Field of Classification Search ................ 720/710
See application file for complete search history.

(56) References Cited

U.S. PATENT DOCUMENTS

| 4,589,105 A | 5/1986 | Nemoto et al. ............. 720/743 |
| 4,736,357 A | 4/1988 | Uehara et al. ............. 720/713 |
| 6,219,325 B1 | 4/2001 | Sato ......................... 720/703 |

FOREIGN PATENT DOCUMENTS

JP        09063167 A    *  3/1997

* cited by examiner

*Primary Examiner*—David D. Davis
(74) *Attorney, Agent, or Firm*—Oblon, Spivak, McClelland, Maier & Neustadt, P.C.

(57) ABSTRACT

An optical disk drive having a turntable for carrying an optical disk with a clamping plate made of a magnetic material having a clamping area. A magnet is included for attracting to a turntable side the clamping plate of the optical disk placed on the turntable in a noncontact state. A motor is included for rotating the turntable with the optical disk placed thereon, wherein an attraction force of the magnet attracting the clamping plate is a value by which bending of the optical disk accompanied with the attraction of the clamping plate becomes within a permissible error range. A recording and reproducing apparatus may also incorporate the optical disk drive.

8 Claims, 7 Drawing Sheets

OPTICAL DISK DRIVE AND RECORDING AND REPRODUCING APPARATUS WITH MAGNETIC CLAMPING

CROSS-REFERENCE TO RELATED APPLICATIONS

This application is a continuation of U.S. patent application Ser. No. 09/704,856, filed Nov. 2, 2000 now U.S. Pat. No. 6,877,165, the entire contents of which is hereby incorporated herein by reference.

BACKGROUND OF THE INVENTION

1. Field of the Invention

The present invention relates to an optical disk drive for rotating an optical disk and a recording and reproducing apparatus for recording and/or reproducing information by using the optical disk.

2. Description of the Related Art

In recent years, in the field of information storage, there has been much research on the optical recording system and magneto-optic recording system. The magneto-optic information recording system has the advantages that high speed recording and reproduction are possible, that various forms of memory such as playback only types, additional write types, and rewriteable types can be easily handled, that utilization as an exchangeable medium is easier in comparison with magnetic recording type disks, etc. and has a broad range of application from the industrial to the consumer sector as a system enabling realization of cheap, large sized files.

As playback only type recording media, compact disks, video disks, etc. have been spread. Mini Discs etc. have spread as rewritable recording media.

Note that, as the recording medium of the optical recording system and magneto-optic recording system, an optical disk comprised of a disk-like optical disk substrate on which a recording layer made of various types of functional films is formed is general.

Among the optical disks, a magneto-optic disk is comprised of an optical disk substrate formed with a recording layer comprised of a vertically magnetized film made of a rare earth metal-transition metal amorphous alloy such as a TbFeCo alloy as the functional film.

In order to record or reproduce information to or from a magneto-optic disk, a laser beam or other beam is irradiated from a transparent substrate side. At the recording of information, the coercive force of the vertically magnetized film is lowered at the position where the laser beam or other laser beam is focused. By applying a magnetic field to this focused position from the outside, the magnetization of the focused position is inverted to record the information.

In order to read the recorded information by the length and direction of magnetization, use is made of the Kerr effect of the polarization direction of a reflected laser beam rotating in different directions according to the direction of magnetization when a linear polarized laser beam is reflected at a magnetized film surface.

When recording and reproducing information, the optical disk is rotated around its center axis by for example a spindle motor or other motor. A center hole is formed at the center portion of the optical disk. As an example, the center hole is fitted over a rotary shaft of a turntable, the optical disk set on the turntable, and the turntable rotated by the spindle motor to rotate the optical disk.

Summarizing the problems to be solved by the invention, in the optical recording system and magneto-optic recording system, an increase of the density of the recorded information is being sought. In order to achieve this, it has been required to increase the numerical aperture (NA) of the object lens for condensing the laser beam or other light on the optical disk or shorten the wavelength $\lambda$ of the light.

If increasing the numerical aperture of the object lens, coma aberration tends to occur. This coma aberration occurs when the beam supposed to vertically strike the recording surface of the optical disk strikes the optical disk at an angle and increases in proportional to the cube of the numerical aperture of the object lens and the thickness of a light transmission portion of the optical disk.

For this reason, it is possible to make the substrate of the optical disk thinner to reduce the coma aberration. Reducing the thickness of the optical disk is also effective from the viewpoint of suppressing birefringence. However, the reduction of the thickness of the substrate of the optical disk makes it difficult to secure rigidity of the optical disk.

Generally, a magneto-optic disc is enclosed in a cartridge and handled as an exchangeable medium.

The spindle motor and the optical disk are clamped inside the optical disk drive by a clamping plate made of a magnetic material arranged in the vicinity of a clamping area of the optical disk and a clamping magnet attached to the turntable.

The attraction force (clamp force) of the magnet is generated at an inner circumference side of the disk from the clamping area.

If warping occurs in a radius direction in the optical disk due to such an attraction force, the beam to be focused on the optical disk at the time of recording and reproduction of the information no longer vertically strikes the optical disk substrate. As a result, the reflected beam does not correctly return to the object lens or other receptor, but coma aberration is generated and therefore correct servo control and correct recording and reproduction of information become difficult.

Accordingly, the attraction force of the magnet must be set to a value that suppresses bending of the optical disk occurring due to attraction to not more than a predetermined value.

In a recording and reproducing apparatus recording and reproducing information by using an optical disk, however, the user sometimes operates the recording and reproducing apparatus around a vertical axis vertical to the rotational axis of the optical disk rotating by the motor. In this case, a moment (gyro moment) is generated in the optical disk. For example, when the recording and reproducing apparatus is a disk camcorder recording a video signal, the user sometimes twists the camcorder about to move the field of view of a viewfinder.

Here, an orthogonal coordinate system having an X-axis, a Y-axis, and a Z-axis is set up. A case where an optical disk of an inertia moment I is rotated about the Z-axis within an XY plane at an angular velocity $\Omega$ is assumed. When this optical disk is rotated around the Y-axis at the angular velocity $\omega$, a gyro moment M is generated. The magnitude thereof becomes $$M = I \times \omega \times \Omega \tag{1}$$

When the attraction force of the magnet is small, the optical disk is liable to detach from the top of the turntable due to the gyro moment M.

For this reason, the attraction force of the magnet must be set to a value where the optical disk does not detach from the turntable by the gyro moment generated when the recording and reproducing apparatus or the optical disk drive is used.

SUMMARY OF THE INVENTION

An object of the present invention is to provide an optical disk drive and a recording and reproducing apparatus capable of holding the optical disk on the turntable while suppressing bending of the optical disk due to the attraction force of a magnet.

According to a first aspect of the present invention, there is provided an optical disk drive having a turntable for carrying an optical disk with a clamping plate made of a magnetic material attached to the vicinity of its clamping area thereon, a magnet for attracting the clamping plate of the optical disk placed on the turntable to the turntable side in a noncontact state, and a motor for rotating the turntable with the optical disk placed thereon, wherein the attraction force of the magnet attracting the clamping plate is a value by which bending of the optical disk accompanied with the attraction of the clamping plate becomes within a permissible error range.

Preferably, the permissible error range of the bending of the optical disk is a range by which an inclination angle in an information area of the optical disk (with respect to a plane vertical to a rotation axis of the rotation of the optical disk by the motor) becomes 0.02 degree or less.

Preferably the attraction force is a value by which the optical disk does not detach from the top of the turntable when the optical disk is rotated by about 60 degrees for about 0.25 seconds around a vertical axis vertical to the rotation axis of the rotation of the optical disk by the motor.

More preferably, the motor rotates the optical disk at a constant linear speed, and the attraction force has a value by which the optical disk rotating at the maximum rotation speed does not detach from the top of the turntable.

Preferably the optical disk is a magneto-optic disk having a diameter of about 50 mm to about 51 mm or about 64 mm to about 65 mm, a density of about 0.9 g/cm$^3$ to about 1.5 g/cm$^3$, a thickness in the information area of about 0.5 mm to about 0.7 mm, and a thickness in the clamping area of about 1.2 mm. The clamping plate is arranged from a center hole to the clamping area. The turntable has a flat portion and an annular projection portion having a constant height located on the periphery of this flat portion and in contact with the clamping area. The magnet is an annular permanent magnet which faces the clamping plate in the noncontact state with a constant or substantially constant gap therebetween. Attached to the flat portion, and arranged concentrically with respect to the projection portion, the thickness of the magnet is thinner than the height of the projection portion, and the attraction force is within a range of about 0.75 N to about 2 N.

More preferably, the attraction force is within a range of about 1.0 N to about 1.2 N.

For example the magnet is a neodymium-based or a samarium cobalt-based compound, the thickness of the magnet is within a range of about 0.8 mm to about 1.2 mm, the gap is within a range of about 0.1 mm to about 0.7 mm, and preferably the gap is within a range of about 0.15 mm to about 0.3 mm.

Preferably the magnet is an annular permanent magnet which is symmetric or substantially symmetric with respect to the rotation axis of the rotation of the optical disk by the motor. The magnet faces the clamping plate with a constant or substantially constant gap therebetween, and the attraction force is a value of $I \times \Omega \times \omega / \{(a^2+b^2)/8\}^{1/2}$ or more. More preferably, the attraction force is a value of $I \times \Omega \times \omega / \{(a+b)/4\}$ or more.

Note, I is an inertia moment of the optical disk, $\Omega$ is an angular velocity of the optical disk rotating around the rotation axis at the maximum rotation speed, $\omega$ is the maximum angular velocity around the vertical axis where the optical disk is rotated around the vertical axis vertical to the rotation axis by about 60 degrees for about 0.25 seconds, a is an inner diameter of a facing portion facing the clamping plate in the magnet with a constant or substantially constant gap therebetween, and b is an outer diameter of the facing portion.

According to a second aspect of the present invention, there is provided a recording and reproducing apparatus having a turntable for carrying an optical disk with a clamping plate made of a magnetic material attached to the vicinity of its clamping area thereon, a magnet for attracting the clamping plate of the optical disk placed on the turntable to the turntable side in a noncontact state, a motor for rotating the turntable with the optical disk placed thereon, and a recording and reproducing means for recording the information with respect to the rotating optical disk or reproducing the recorded information from the rotating optical disk, wherein the attraction force of the magnet attracting the clamping plate is a value by which bending of the optical disk accompanied with the attraction of the clamping plate becomes within a permissible error range.

Preferably the permissible error range of the bending of the optical disk is a range by which an inclination angle in an information area of the optical disk with respect to a plane vertical to a rotation axis of the rotation of the optical disk by the motor becomes 0.02 degree or less.

Preferably the attraction force has a value by which the optical disk does not detach from the top of the turntable when the optical disk is rotated by about 60 degrees for about 0.25 second around a vertical axis vertical to the rotation axis of the rotation of the optical disk by the motor.

More preferably the motor rotates the optical disk at a constant linear speed, and the attraction force has a value by which the optical disk rotating at the maximum rotation speed does not detach from the top of the turntable.

Preferably the optical disk is a magneto-optic disk having a diameter of about 50 mm to about 51 mm or about 64 mm to about 65 mm, a density of about 0.9 g/cm$^3$ to about 1.5 g/cm$^3$, a thickness in the information area of about 0.5 mm to about 0.7 mm, and a thickness in the clamping area of about 1.2 mm, the clamping plate is arranged from a center hole to the clamping area, the turntable has a flat portion and an annular projection portion having a constant height located on the periphery of this flat portion and in contact with the clamping area, the magnet is an annular permanent magnet which faces the clamping plate in the noncontact state with a constant or substantially constant gap therebetween, attached to the flat portion, and arranged concentrically with respect to the projection portion, the thickness of the magnet is thinner than the height of the projection portion, and the attraction force is within a range of about 0.75 N to about 2 N.

More preferably, the attraction force is within a range of about 1.0 N to about 1.2 N.

For example the magnet is a neodymium-based or a samarium cobalt-based compound, the thickness of the magnet is within a range of about 0.8 mm to about 1.2 mm, the gap is within a range of about 0.1 mm to about 0.7 mm, and preferably the gap is within a range of about 0.15 mm to about 0.3 mm.

Preferably the magnet is an annular permanent magnet which is symmetric or substantially symmetric with respect to the rotation axis of the rotation of the optical disk by the motor and faces the clamping plate with a constant or substantially constant gap therebetween, and the attraction force is a value of $I \times \Omega \times \omega / \{(a^2+b^2)/8\}^{1/2}$ or more. More preferably, the attraction force is a value of $I \times \Omega \times \omega / \{(a+b)/4\}$ or more.

Note, I is an inertia moment of the optical disk, $\Omega$ is an angular velocity of the optical disk rotating around the rotation axis at the maximum rotation speed, $\omega$ is the maximum angular velocity around the vertical axis where the optical disk is rotated around the vertical axis vertical to the rotation axis by about 60 degrees for about 0.25 second, a is an inner diameter of a facing portion facing the clamping plate in the magnet with a constant or substantially constant gap therebetween, and b is an outer diameter of the facing portion.

By setting the attraction force of the magnet to a value by which bending of the optical disk accompanied with the attraction of the clamping plate becomes within the permissible error range, it is possible to hold the optical disk on the turntable while suppressing the bending of the optical disk.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, an explanation will be made of preferred embodiments of the present invention by referring to the attached drawings.

Figure 1:
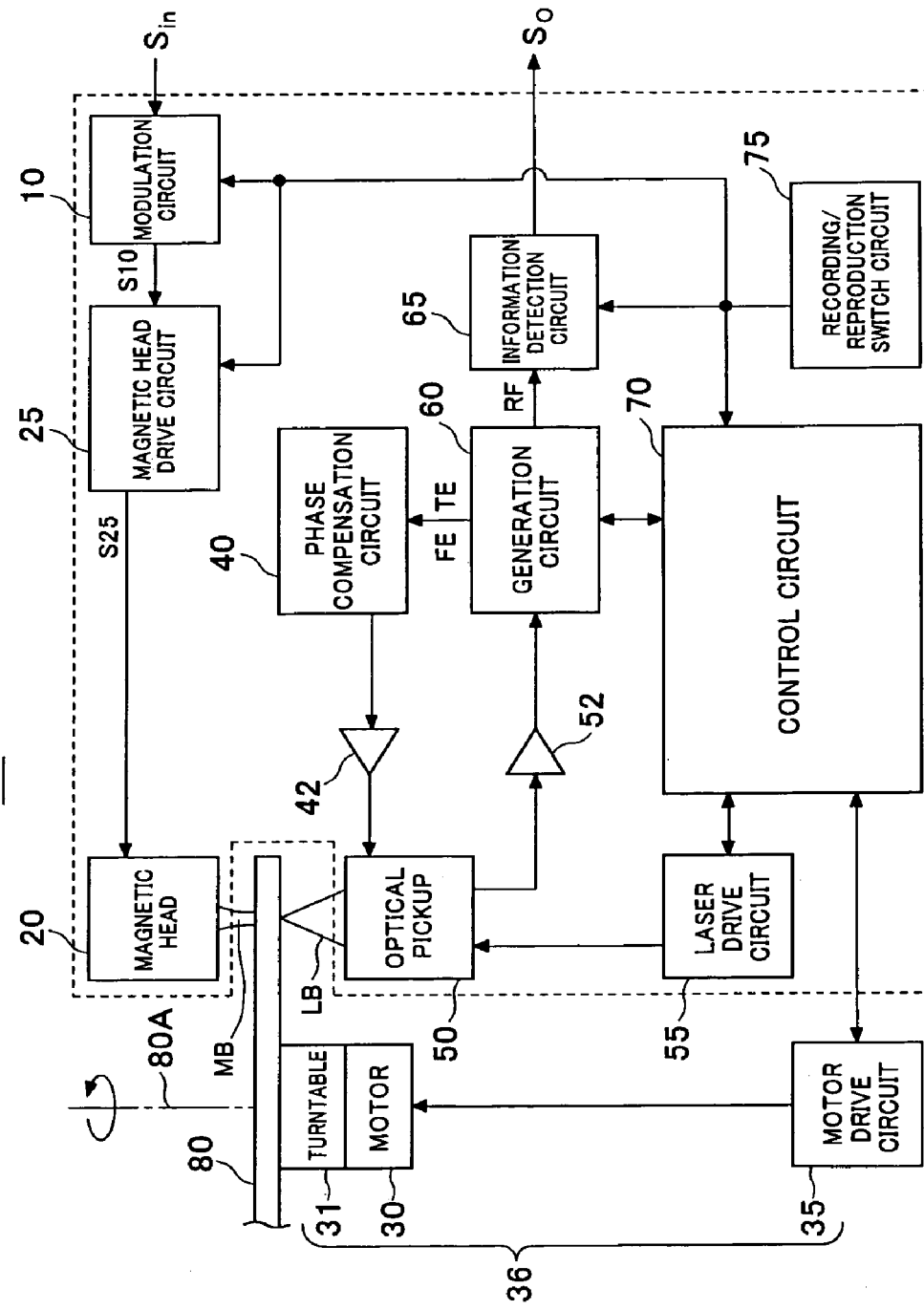
FIG. 1 is a schematic block diagram of the configuration of an embodiment of a recording and reproducing apparatus according to the present invention.

FIG. 1 is a schematic block diagram of the configuration of a recording and reproducing apparatus according to the present invention.

This recording and reproducing apparatus 90 has a recording and reproducing means 95, a motor 30 for rotating an optical disk 80, a turntable 31 for carrying the optical disk 80 thereon, and a motor drive circuit 35 and configures for example a disk camcorder. The optical disk 80 is for example a magneto-optic disk.

The recording and reproducing means 95 has a modulation circuit 10, a magnetic head 20, a magnetic head drive circuit 25, a phase compensation circuit 40, an amplifier circuit 42, an optical pickup 50, an amplifier circuit (head amplifier) 52, a laser drive circuit 55, a generation circuit 60, an information detection circuit 65, a control circuit 70, and a recording/reproduction switch circuit 75.

This recording and reproducing means 95 records information on the rotating optical disk 80 or reproduces recorded information from the rotating optical disk 80.

Note that an optical disk drive 36 for rotating the optical disk 80 is configured by the motor 30, turntable 31, and the motor drive circuit 35.

The control circuit 70 is a controller for the overall control of the recording and reproducing apparatus 90 and is configured by for example a microcomputer.

This control circuit 70 controls the motor drive circuit 35, laser drive circuit 55, optical pickup 50, actuators 26 and 56, phase compensation circuit 40, generation circuit 60, information detection circuit 65, magnetic head drive circuit 25, and the modulation circuit 10.

The optical pickup 50 focuses a laser beam LB on the recording portion of the optical disk 80 at the time of recording and focuses a laser beam LB on the reproduction portion of the optical disk 80 at the time of reproduction. Note that the power of the laser beam LB is larger at the time of the reproduction than at the time of the recording.

At the time of recording, the modulation circuit 10 receives as input an input signal Sin indicating the information to be recorded, modulates this input signal Sin by an 8-to-14 modulation (EFM) method or the like to generate an output signal S10, and supplies this output signal S10 to the magnetic head drive circuit 25.

The magnetic head drive circuit 25 supplies a current S25 to a coil for energization of a core inside the magnetic head 20 based on the output signal S10 of the modulation circuit 10 to energize the core of the magnetic head 20.

The magnetic head 20 is energized in its core by the energization current S25 from the magnetic head drive circuit 25, generates a magnetic beam MB in accordance with the input signal Sin from the core, and applies a magnetic field in accordance with the input signal Sin to the focused position of the optical disk 80.

The motor 30 is constituted by for example a spindle motor and rotates the turntable 31 and the optical disk 80 placed on this turntable 31 around a rotation axis 80A at a predetermined rotation speed.

This motor 30 rotates the optical disk 80 so that the linear speed becomes constant as one example. Note that the motor 30 and the turntable 31 may be integrally provided.

The motor drive circuit 35 supplies drive power to the motor 30 to drive the motor 30. This motor drive circuit 35 can control the rotation of the motor 30 by pulse width modulation (PWM) control or controls the rotation by phase locked loop (PLL) control.

The laser drive circuit 55 drives the laser in the optical pickup 50 and makes the laser output the laser beam LB. The laser drive circuit 55 makes the output power of the laser beam LB larger at the time of recording than at the time of reproduction.

The optical pickup 50 has a laser, an object lens, a collimator lens, an optical detector, a beam splitter, a polarized beam splitter, a focusing actuator, a tracking actuator, etc.

The laser is constituted by for example a GaN-based semiconductor laser outputting a blue or blue-violet laser beam.

The output laser beam LB of the laser is collimated to a parallel beam by the collimator lens and supplied to the beam splitter. The beams transmitted through the beam splitter are condensed at the object lens and supplied to the recording film of the optical disk 80, whereby the recording position or the reproduction position is irradiated.

At the time of recording, the focused position of the optical disk 80 rises to a high temperature that exceeds the Curie point of the recording film, the focused position is magnetized by the magnetic field applied from the magnetic head 20, and thus the input signal Sin is recorded.

The beam reflected at the optical disk 80 passes through the object lens and is supplied to the beam splitter. This beam splitter supplies the reflected beam to the optical detector.

The optical detector is constituted by for example a four-divided optical:detector obtained by dividing a light receiving portion to four, distributes the reflected beam from the beam splitter at the polarized beam splitter, receives the light at two systems of optical detectors to generate a light reception signal, and supplies the related light reception signal to the amplifier circuit 52.

The amplifier circuit (head amplifier) 52 amplifies the light reception signal and supplies the same to the generation circuit 60.

The generation circuit 60 generates a:reproduction signal RF, a focus error signal FE, and a tracking error signal TE based on the light reception signal from the amplifier circuit 52. The generation circuit 60 generates a reproduction signal (MO reproduction signal) RF as the magneto-optic signal based on a difference of for example the light reception signals from the two systems of optical detectors.

The phase compensation circuit 40 compensates the focus error signal FE and the tracking error signal TE (in phase and/or frequency) to generate compensated signals and supplies the compensated signals to the amplifier circuit 42.

The amplifier circuit 42 amplifies the compensated signal of the focus error signal FE and supplies the same to the focusing actuator in the optical pickup 50.

Further, the amplifier circuit 42 amplifies the compensated signal of the tracking error signal TE and supplies the same to the tracking actuator in the optical pickup 50.

The focusing actuator moves the object lens in the focus direction based on the output signal of the amplifier circuit 42 and controls the distance between the object lens and the optical disk 80 at the time of recording to the predetermined distance.

The tracking actuator moves the object lens in a radial direction or a tracking direction based on the output signal of the amplifier circuit 42 and holds the laser beam LB passed through the object lens at the track center portion of the optical disk 80.

The information detection circuit 65 is supplied with the reproduction signal RF from the generation circuit 60, demodulates the reproduction signal RF etc. to reproduce the recorded information of the optical disk 80, and outputs the reproduced recorded information as the output signal So.

The recording/reproduction switch circuit 75 generates a switch signal for switching the recording and the reproduction of the recording and reproducing apparatus 90 and supplies this switch signal to the control circuit 70, information detection circuit 65, modulation circuit 10, the magnetic head drive circuit 25, etc.

The modulation circuit 10 stops the supply of the output signal S10 to the magnetic head drive circuit 25 when the switch signal indicating reproduction is supplied. Further, the magnetic head drive circuit 25 stops the supply of the energization current S25 to the magnetic head 20 when the switch signal indicating reproduction is supplied.

On the other hand, the information detection circuit 65 stops the generation of the output signal So when the switch signal indicating recording is supplied. Further, the control circuit 70 controls the laser output power of the optical pickup 50 in accordance with the switch signal.

Figure 2:
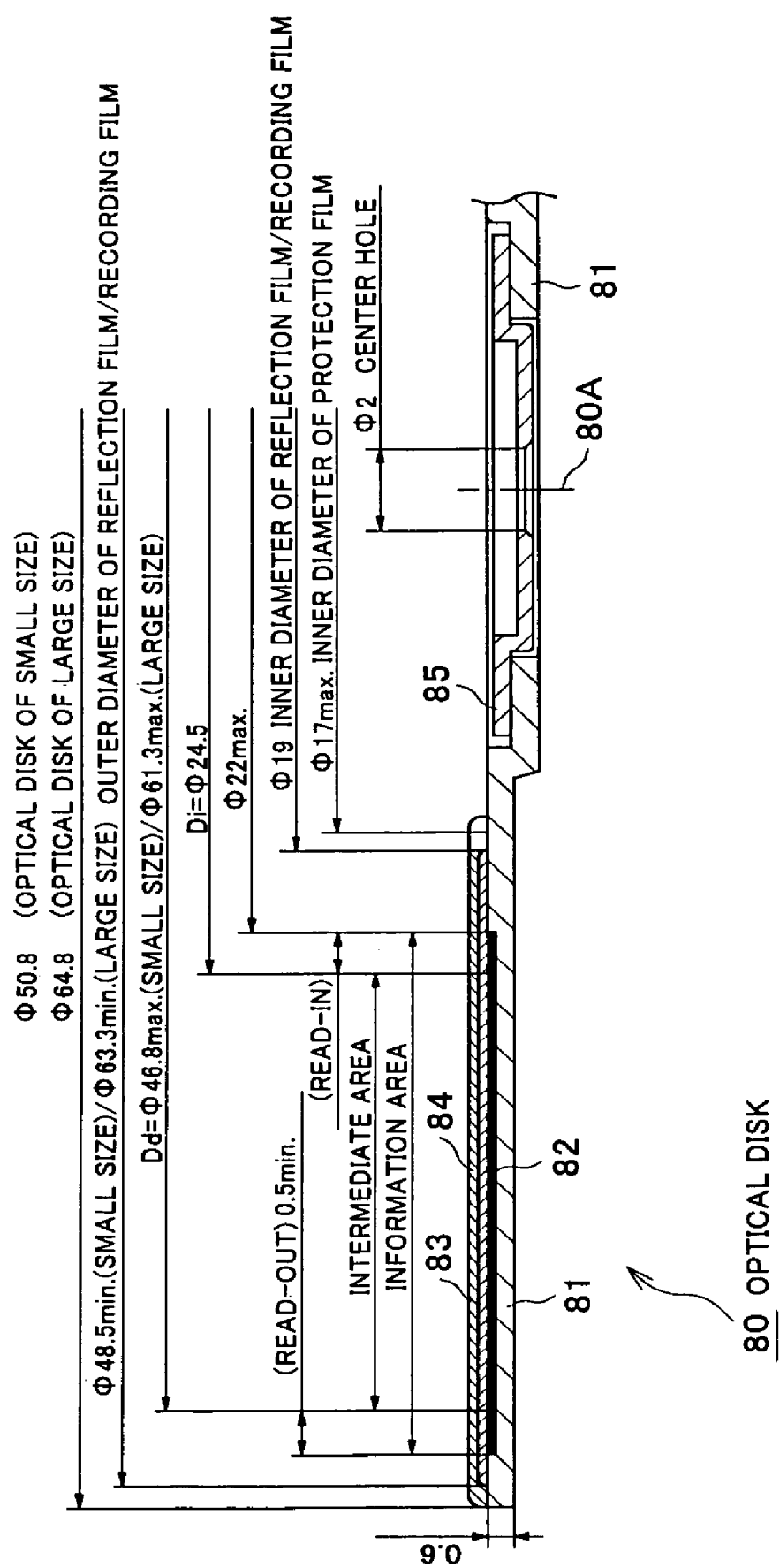
FIG. 2 is a view of the configuration of part of an optical disk.

FIG. 2 is a view of the configuration of part of the optical disk 80.

The optical disk 80 has a transparent substrate 81, a multiple layer film 83 having a reflection film and a recording film, a protection film 84, and a clamping plate 85 made of a magnetic material.

Among the optical disks 80, a small sized optical disk 80 has a diameter of about 50 mm to about 51 mm, while a large sized optical disk has a diameter of about 64 mm to about 65 mm.

The outer diameter of the multiple layer film 83 is about 48.5 mm in a small sized optical disk and about 63.3 mm in a large sized optical disk. The inner diameter of the multiple layer film 83 is about 19 mm.

The information area 82 has a read-in area, a read-out area, and an intermediate area sandwiched between the read-in area and read-out area. This annular intermediate area has a recordable area or a program area.

The outer diameter of the intermediate area is about 46.8 mm in a small sized optical disk and about 61.3 mm in a large sized optical disk.

The inner diameter of the intermediate area is about 24.5 mm, while the inner diameter of the information area 82 is about 22 mm.

The diameter of the center hole is about 2 mm.

The thickness of the film obtained by stacking the multiple layer film 83 and the protection film 84 is about 0.05 mm, the thickness of the transparent substrate 81 in the information area 82 is about 0.5 mm to about 0.6 mm, and the thickness of the optical disk 80 in the information area 82 becomes about 0.5 mm to about 0.7 mm.

Figure 3:
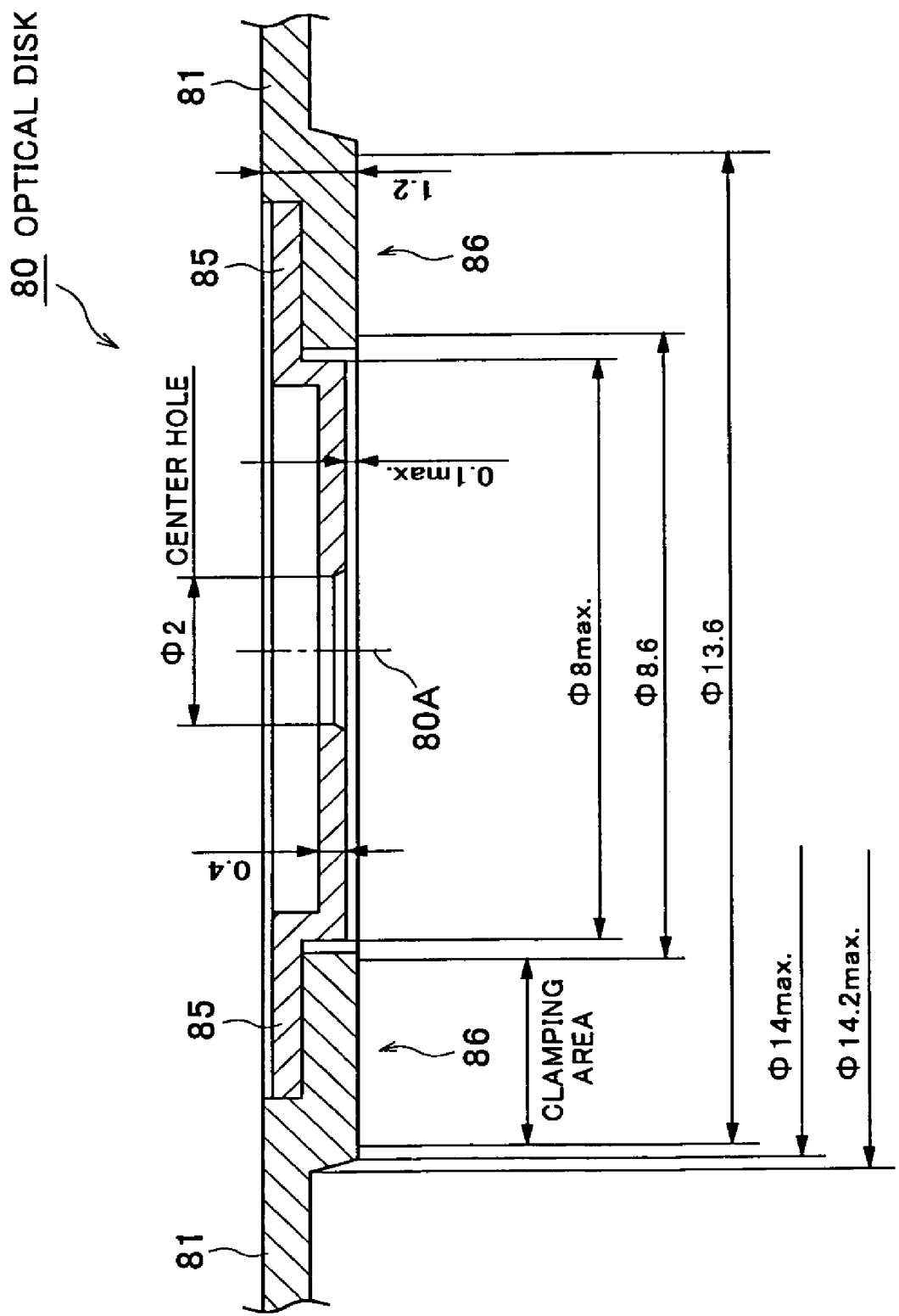
FIG. 3 is a view of the structure in the vicinity of a clamping area and a center hole of the optical disk.

FIG. 3 is a view of the structure in the vicinity of the clamping area and the center hole of the optical disk 80.

The optical disk 80 has a clamping area 86. The clamping plate 85 is attached from the clamping area 86 to the center hole.

The inner diameter of the clamping area 86 is about 8.6 mm, while the outer diameter is about 13.6 mm.

The thickness in the clamping area 86 is about 1.2 mm. An inclination for making the thickness greater than that in the information area is provided in the portion at about 14 mm to about 14.2 mm along the diameter.

The thickness of the clamping plate 85 is about 0.4 mm. There is a gap of about 0.1 mm at the maximum between the bottom surface of the clamping plate 85 and the bottom surface of the optical disk 80 including the clamping area 86.

The inner diameter of the transparent substrate 81 is about 8.6 mm. A step is provided from the portion 12 mm along the diameter to the disk center side.

The bottom surface of the clamping plate 85 is bent at schematically a right angle at the portion 8 mm along the diameter. The bottom surface of the portion more than about 8 mm along the diameter in the clamping plate 85 is attached to the step tightly fixed thereto.

Figure 4:
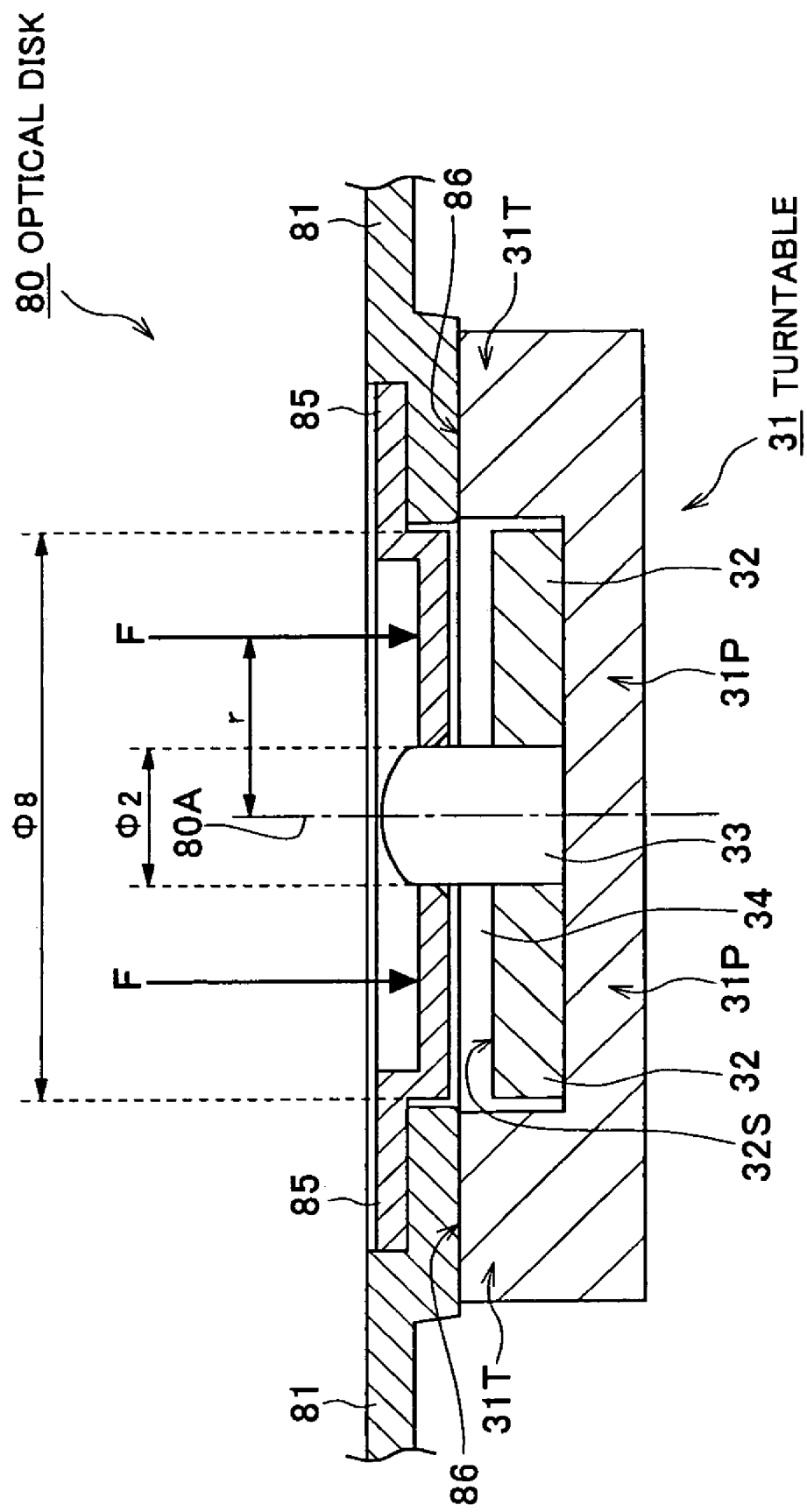
FIG. 4 is view for explaining a turntable with an optical disk placed thereon.

FIG. 4 is a view explaining the turntable 31 with the optical disk 80 placed thereon.

The turntable 31 has a flat portion 31P and an annular and constant height projection portion 31T located on the periphery of this flat portion 31P and in contact with the clamping area 86.

The annular permanent magnet 32 is attached to the flat portion 31P. This permanent magnet 32 is arranged concentrically with respect to the projection portion 31T. The thickness of the permanent magnet 32 is less than the height of the projection portion 31T.

The permanent magnet 32 faces the clamping plate 85 in a noncontact state with a gap of a constant or substantially constant interval and attracts the clamping plate 85. It attracts the optical disk 80 to the turntable 31 side. The outer diameter of the annular permanent magnet 32 is about 8 mm, and the inner diameter is about 2 mm. Further, the surface of the annular permanent magnet 32 facing the clamping plate 85 constitutes a facing portion 32S. The outer diameter of this facing portion 32S is about 8 mm, while the inner diameter is about 2 mm.

The turntable 31 and the optical disk 80 placed on this turntable 31 rotate around the rotation axis 80A by the rotation of a shaft 33 of the motor 30.

Figure 5:
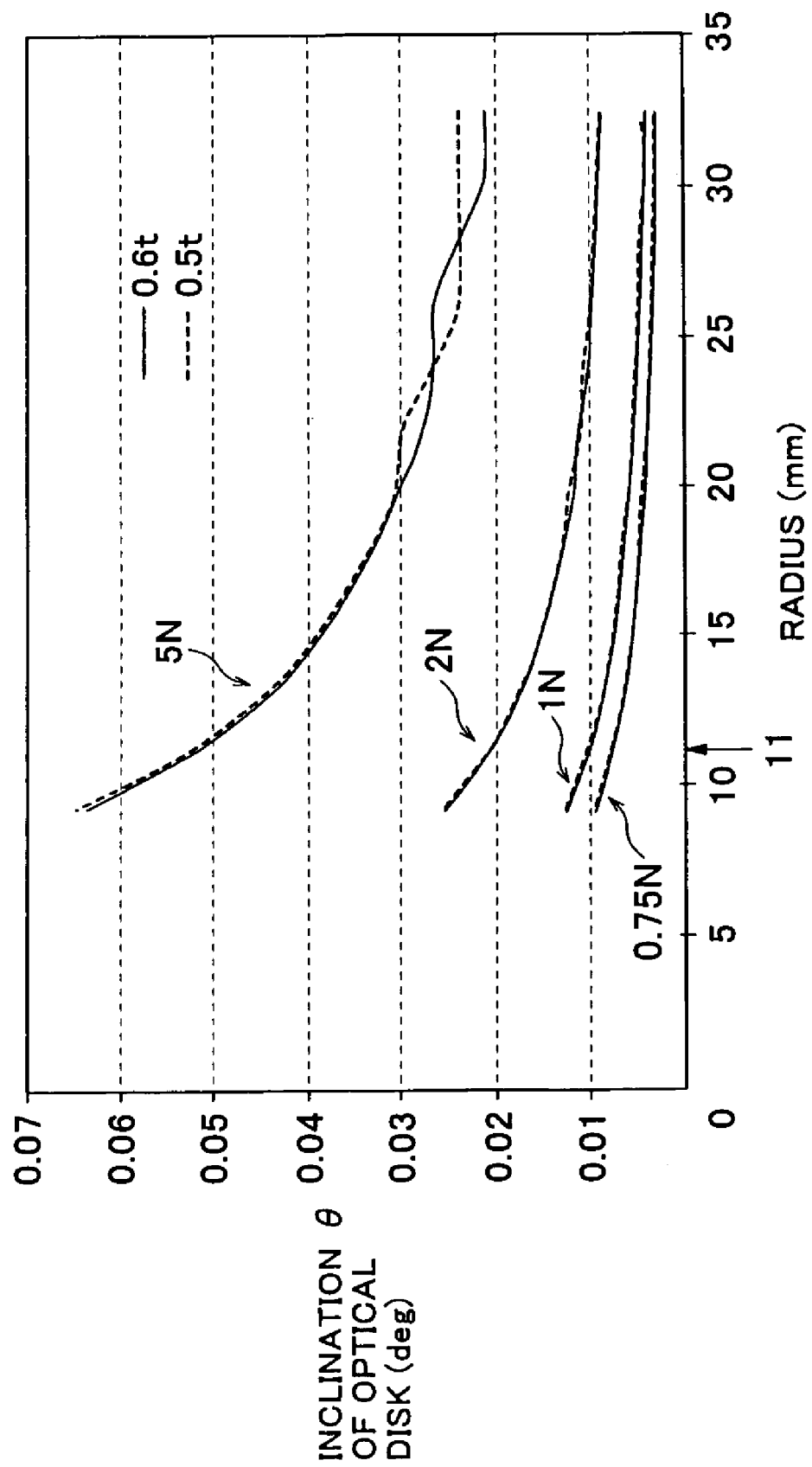
FIG. 5 is a graph of bending of the optical disk due to an attraction force of a permanent magnet.

FIG. 5 is a graph of the bending of the optical disk 80 due to the attraction force of the permanent magnet 32.

In this graph, an inclination θ of the optical disk 80 with respect to a plane vertical to the rotation axis 80A is shown for a case where the attraction force of the permanent magnet 32 is 0.75 N, 1 N, 2 N, and 5 N.

A case where the thickness of the transparent substrate 81 in the information area 82 of the optical disk 80 is about 0.6 mm is represented by a solid line, while a case where the thickness of the transparent substrate 81 in the information area 82 is about 0.5 mm is represented by a dotted line.

Note that the diameter of the optical disk 80 is about 65 mm, the transparent substrate 81 is made of the plastic material for the optical disk 80, the Young's modules is about $2.3 \times 10^6$ mN/mm$^2$, the density is about 1.2 g/cm$^3$ (specific gravity of about 1.2), and the other conditions are based on those of polycarbonate.

A case where the optical disk 80 was attracted to the turntable 31 side by the permanent magnet 32, the clamping area 86 of the optical disk 80 was in contact with the projection portion 31T of the turntable 31, and the attraction force by the permanent magnet 32 was about 0.75 N to about 5 N (a case where for example a force equivalent to the attraction force at the rotation axis 80A is about 0.75 N to about 5 N) was assumed.

According to the graph of FIG. 5, both when the thickness of the transparent substrate 81 in the information area 82 is about 0.6 mm and about 0.5 mm, the bending of the optical disk 80 due to the attraction force is not that much different. Note that when the diameter of the optical disk 80 was about 51 mm, characteristics resembling to those of FIG. 5 were obtained.

The information area 82 is provided outside from the position about 11 mm along the radius. For this reason, the position about 11 mm along the radius will be referred to in the graph of FIG. 5.

The inclination (inclination angle) θ of the optical disk 80 also depends upon the precision and margin of the recording and reproducing apparatus 90 and the optical disk drive, but if it is about 0.02 degree or less, it is within the permissible error range and can be the to be small enough to be negligible.

From this viewpoint, the upper limit of the attraction force by the permanent magnet 32 can be set to about 2 N.

Figure 6:
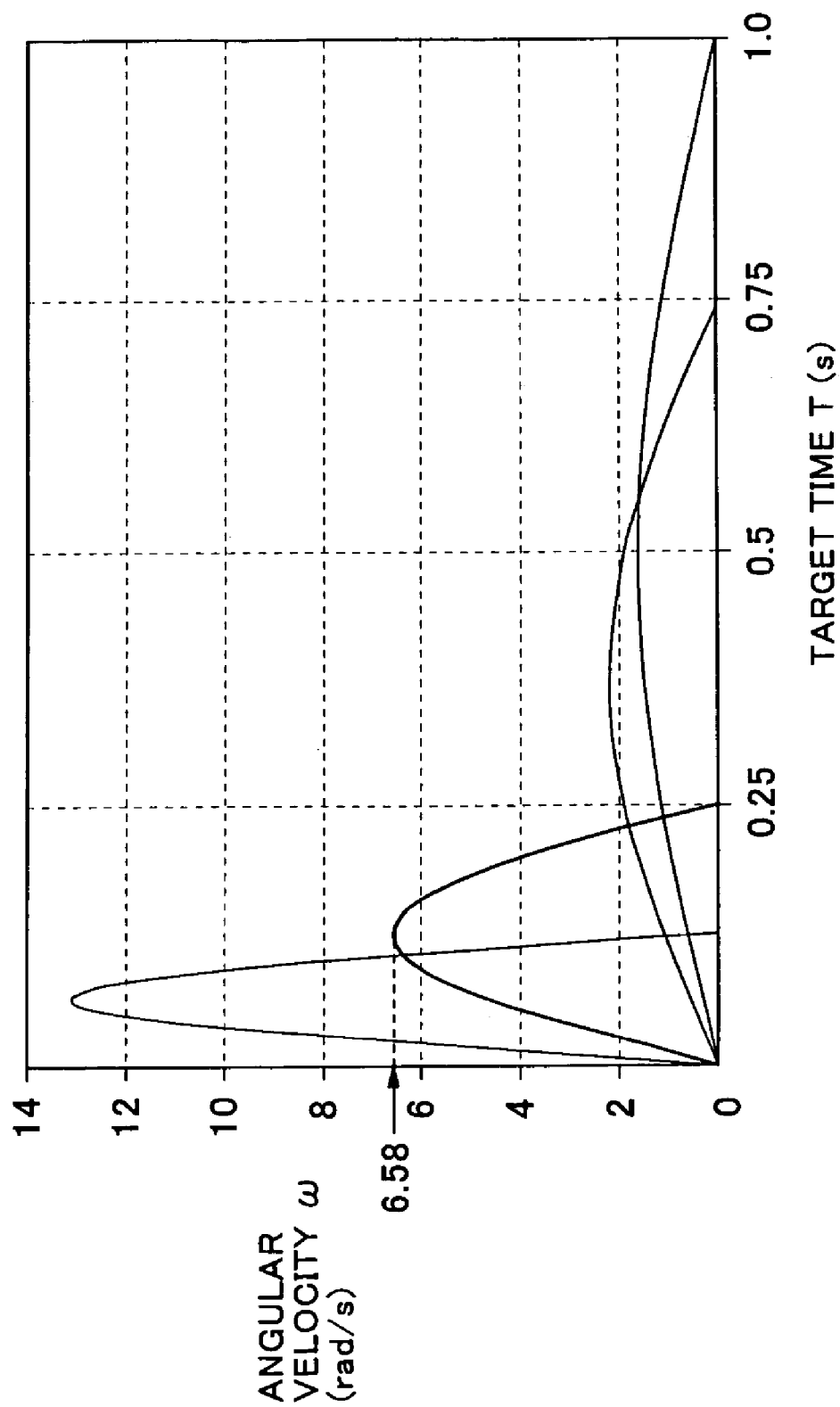
FIG. 6 is an explanatory view of a distribution of an angular velocity $\omega$ where an angle of 60 degrees is rotated for a target time T.

FIG. 6 is a view of the distribution of the angular velocity ω in a case of rotation over an angle of 60 degrees for a target time T. In this view, a case where the distribution of the angular velocity ω is a sine curve is assumed.

When rotating over an angle of 60 degrees in 0.25 sec, the maximum angular velocity becomes about 6.58 rad/sec. In a recording and reproducing apparatus 90 having an optical disk drive, particularly in a portable recording and reproducing apparatus, the actual twisting of the apparatus caused by the user can be approximated by rotation over an angle of about 60 degrees in about 0.25 sec, and the maximum angular velocity which can be generated by the user at the operation of the device can be assumed to about 6.58 rad/sec based on this.

The gyro moment M is represented by $M = I \times \omega \times \Omega$.

The lower limit value of the attraction force F of the permanent magnet 32 may be calculated for the optical disk 80 (φ 65 mm) having a large inertia moment I based on the gyro moment in the case where the motor speed is the maximum. Further, the angular velocity ω may be made 6.58 rad/sec.

When the track pitch of the optical disk 80 is about 0.37 μm, the pit length is about 0.15 μm, the data efficiency is about 75%, and the data transfer speed is about 20 Mbps (megabit/second), the linear speed becomes about 4.0 m/sec.

When the optical disk 80 is rotated at a constant linear speed, the rotation speed at the innermost circumference (radius: about 11 mm) becomes the maximum, and the rotation speed thereof becomes about 3500 rpm (about 3500 rotation/min).

Accordingly, the angular velocity Ω around the rotation axis 80A when the optical disk 80 rotates at the maximum speed is found from the following equation (2):

$$\Omega = 2\pi \times 3500/60 = 367 \text{ rad/sec} \tag{2}$$

The inertia moment I of the optical disk 80 becomes $$I = 0.59 \times 10^{-6} \text{ kg} \cdot \text{m}^2 \tag{3}$$

when the diameter of the optical disk 80 is about 65 mm, the disk is made of a plastic material for an optical disk, the Young's modules is $2.3 \times 10^6$ mN/mm$^2$, and the density is about 1.2 g/cm$^3$.

From the above, the maximum value of the gyro moment M becomes a value shown in the following equation (4):

$$\begin{aligned} M &= I \times \omega \times \Omega \\ &= (0.59 \times 10^{-6}) \times 6.58 \times 367 \\ &= 142 \times 10^{-5} \text{ kg} \cdot \text{m}^2/\text{sec}^2 \\ &= 142 \times 10^{-5} \text{ N} \cdot \text{m} \end{aligned} \tag{4}$$

Next, it is assumed that the attraction force F by the permanent magnet 32 acts upon the position of the radius r of the optical disk 80 as shown in the explanatory view of FIG. 4 described above.

In this case, if a torque (r×F) is the gyro moment M or more (r×F ≧ M), the optical disk 80 can be prevented from being detached from the turntable 31. Namely, the following must stand $$\text{Attraction force } F \geq M/r \tag{5}$$

If it is assumed that the attraction force F acts upon the optical disk 80 at the position about 5 mm along the diameter, that is, the center value of about 2 mm to about 8 mm along the diameter, of the clamping plate 85, the radius r=(2+8)/4=2.5 mm, and the minimum value Fa of the attraction force F is represented by the following equation (6):

$$Fa = M/r \quad (6)$$
$$= 142 \times 10^{-5} / (2.5 \times 10^{-3})$$
$$= 0.57 \text{ N}$$

On the other hand, in the portion of about 2 mm to about 8 mm along the diameter of the clamping plate 85, when it is assumed that the attraction force F acts upon the optical disk 80 at a position on the radius dividing this annular area to two, the radius $r=\{(2^2+8^2)/8\}^{1/2}=2.9$ mm, and the minimum value Fb of the attraction force F is represented by the following equation (7):

$$Fb = M/r \quad (7)$$
$$= 142 \times 10^{-5} / (2.9 \times 10^{-3})$$
$$= 0.49 \text{ N}$$

When it is assumed that there is an error of ±30% in the density (or specific gravity) of the material of the optical disk 80, an error of +30% occurs also in the inertia moment I.

When considering this error of the material, when setting values Fa' and Fb' obtained by multiplying the attraction forces Fa and Fb by 1.3, even if there is an error of the density of ±30%, the optical disk 80 can be prevented from being detached from the turntable 31.

Fa'=Fa×1.3=0.57×1.3=0.74 N
Fb'=Fb×1.3=0.49×1.3=0.64 N

From the above, it was clarified that the attraction force F for attracting the clamping plate 85 of the optical disk 80 by the permanent magnet 32 should be set at about 0.65 N or more, preferably set at about 0.75 N or more, from the viewpoint of the gyro moment M.

In this way, in the recording and reproducing apparatus 90 and the optical disk drive provided in this recording and reproducing apparatus 90, by setting the attraction force F of the permanent magnet 32 within a range of about 0.65 N to about 2 N, preferably within a range of about 0.75 N to about 2 N, for an optical disk 80 having a thickness in the information area of about 0.5 mm to 0.7 mm, a thickness in the clamping area of about 1.2 mm, and a disk diameter of about 50 mm to about 51 mm or about 64 mm to about 65 mm, the bending of the optical disk 80 accompanied with the attraction can be suppressed and, at the same time, detachment of the optical disk 80 from the turntable 31 due to the gyro moment M can be prevented.

Figure 7:
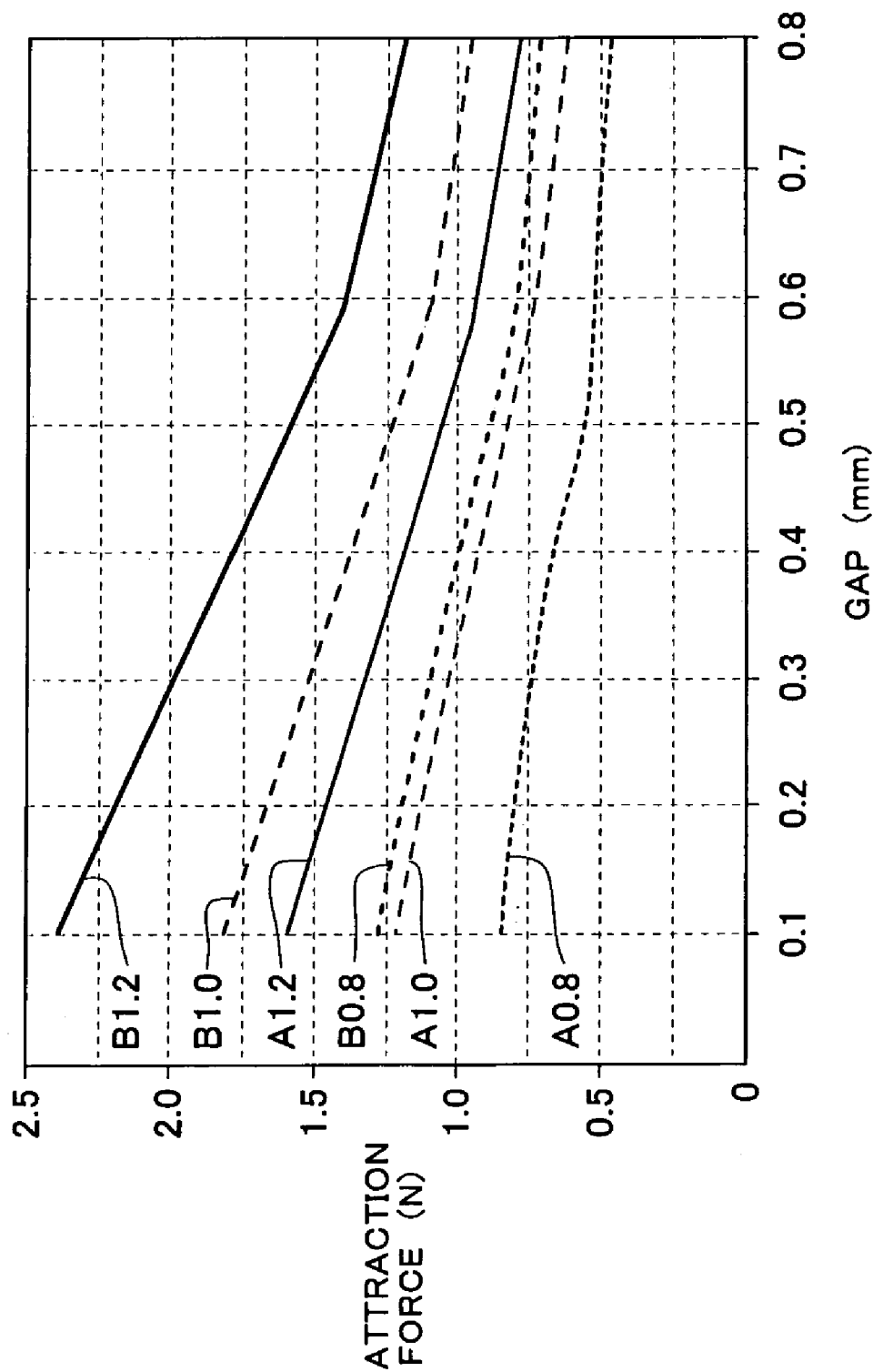
FIG. 7 is a graph of a relationship between an attraction force of the permanent magnet and a gap.

FIG. 7 is a graph of the relationship between the attraction force of the permanent magnet 32 and the gap 34.

This permanent magnet 32 has an annular shape and has an inner diameter of about 2 mm and an outer diameter of about 8 mm. The characteristics of the permanent magnets 32 of type A and type B are exemplified in FIG. 7.

Type A is made of a samarium cobalt (Sm, Co)-based compound.

The residual magnetic flux density Br is about 9200 G to about 10500 G.

The coercive force bHc is about 7500 Oe to about 10000 Oe, and the coercive force iHc is about 9500 Oe to about 14500 Oe.

The maximum energy product BHmax is about 20 MGOe to 25 MGOe.

Cases where the thicknesses of the permanent magnet of type A are 1.2 mm, 1.0 mm, and 0.8 mm are illustrated as characteristic curves A1.2, A1.0, and A0.8.

Type B is made of a neodymium (Nd, Fe, B)-based compound.

The residual magnetic flux density Br is about 11000 G to about 11800 G.

The coercive force bHc is about 10000 Oe to about 11500 Oe, and the coercive force iHc is about 16500 Oe or more.

The maximum energy product BHmax is about 29 MGOe to 34 MGOE. Note that, $1 \text{ G}=1\times10^{-4}$ T, and 1 Oe=1000/4π (A/m).

Cases where the thicknesses of the permanent magnet of type B are 1.2 mm, 1.0 mm, and 0.8 mm are illustrated as characteristic curves B1.2, B1.0, and B0.8.

The gap between the permanent magnet 32 and the clamping plate 85 is about 0.1 mm to about 0.7 mm, preferably within a range of about 0.15 mm to about 0.3 mm. From the illustrated characteristics, various permanent magnets having attraction forces of about 0.65 N to about 2 N, preferably about 0.75 N to about 2 N, can be used.

Note that the above embodiment is just an example of the present invention. The present invention is not limited to the embodiment.

In the recording and reproducing apparatus and the optical disk drive according to the present invention, the attraction force of the magnet has a value by which bending of the optical disk accompanied with the attraction of the clamping plate becomes within the permissible error range and it is possible to hold the optical disk on the turntable while suppressing the bending of the optical disk.

What is claimed is:

1. A recording and reproducing apparatus comprising:
   a turntable configured to carry an optical disk with a clamping plate made of a magnetic material attached in a vicinity of a clamping area thereon;
   a magnet configured to attract said clamping plate of said optical disk placed on said turntable to a turntable side in a noncontact state;
   a motor configured to rotate said turntable with said optical disk placed thereon; and
   a recording and reproducing unit configured to record the information with respect to the rotating optical disk or reproduce the recorded information from the rotating optical disk, wherein
   the attraction force of said magnet attracting said clamping plate is a value by which bending of said optical disk accompanied with the attraction of said clamping plate becomes within a permissible error range, and
   said attraction force has a value by which said optical disk does not detach from the top of said turntable when said optical disk is rotated by about 60 degrees for about 0.25 second around a vertical axis vertical to the rotation axis of the rotation of said optical disk by said motor.

2. A recording and reproducing apparatus as set forth in claim 1, wherein
   said motor rotates said optical disk at a constant linear speed, and
   said attraction force has a value by which said optical disk rotating at the maximum rotation speed does not detach from the top of said turntable.

3. A recording and reproducing apparatus as set forth in claim 1, wherein
   said optical disk comprises a magneto-optic disk having a diameter of about 50 mm to about 51 mm or about 64 mm to about 65 mm, a density of about 0.9 g/cm³ to about 1.5 g/cm³, a thickness in the information area of about 0.5 mm to about 0.7 mm, and a thickness in said clamping area of about 1.2 mm, said clamping plate is arranged from a center hole to said clamping area, said turntable has a flat portion and an annular projection portion having a constant height located on the periphery of this flat portion and in contact with said clamping area, said magnet comprises an annular permanent magnet which faces said clamping plate in the noncontact state with a constant or substantially constant gap therebetween, attached to said flat portion, and arranged concentrically with respect to said projection portion, the thickness of said magnet is thinner than the height of said projection portion, and said attraction force is within a range of about 0.75 N to about 2 N.

4. A recording and reproducing apparatus as set forth in claim 3, wherein said attraction force is within a range of about 1.0 N to about 1.2 N.

5. A recording and reproducing apparatus as set forth in claim 3, wherein said magnet is a neodymium-based or a samarium cobalt-based compound, the thickness of said magnet is within a range of about 0.8 mm to about 1.2 mm, and said gap is within a range of about 0.1 mm to about 0.7 mm.

6. A recording and reproducing apparatus as set forth in claim 3, wherein said gap is within a range of about 0.15 mm to about 0.3 mm.

7. A recording and reproducing apparatus as set forth in claim 1, wherein said magnet comprises an annular permanent magnet which is symmetric or substantially symmetric with respect to the rotation axis of the rotation of said optical disk by said motor and faces said clamping plate with a constant or substantially constant gap therebetween, and said attraction force is a value of $I \times \Omega \times \omega / \{(a^2+b^2)/8\}^{1/2}$ or more, wherein I is an inertia moment of said optical disk, $\Omega$ is an angular velocity of said optical disk rotating around said rotation axis at the maximum rotation speed, $\omega$ is the maximum angular velocity around said vertical axis where said optical disk is rotated around the vertical axis vertical to said rotation axis by about 60 degrees for about 0.25 second, a is an inner diameter of a facing portion facing said clamping plate in said magnet with a constant or substantially constant gap therebetween, and b is an outer diameter of said facing portion.

8. A recording and reproducing apparatus as set forth in claim 7, wherein said attraction force is a value of $I \times \Omega \times \omega / \{(a+b)/4\}$ or more.

* * * * *